United States Patent
Mitchell et al.

(10) Patent No.: US 9,305,320 B2
(45) Date of Patent: Apr. 5, 2016

(54) GENERATION OF ACTIVITY STREAM FROM SERVER-SIDE AND CLIENT-SIDE DATA

(75) Inventors: Justin Mitchell, Palo Alto, CA (US); David Harry Garcia, Sunnyvale, CA (US); Samuel Odio, Portola Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 76 days.

(21) Appl. No.: 13/277,069

(22) Filed: Oct. 19, 2011

(65) Prior Publication Data
US 2013/0103757 A1 Apr. 25, 2013

(51) Int. Cl.
G06F 15/16 (2006.01)
G06Q 50/00 (2012.01)

(52) U.S. Cl.
CPC ........................ *G06Q 50/01* (2013.01)

(58) Field of Classification Search
CPC ................ G06F 15/16; G06Q 50/01
USPC ........................................... 709/204
See application file for complete search history.

(56) References Cited

U.S. PATENT DOCUMENTS

| | | | |
|---|---|---|---|
| 7,243,079 B1* | 7/2007 | Manolis et al. | 705/26.81 |
| 7,555,532 B2* | 6/2009 | Decasper et al. | 709/217 |
| 7,840,563 B2* | 11/2010 | Powers et al. | 707/736 |
| 8,484,314 B2* | 7/2013 | Luna | H04L 67/2842 709/217 |
| 8,539,161 B2* | 9/2013 | Lu | G06F 17/30902 705/319 |
| 8,745,341 B2* | 6/2014 | Turk | G06F 12/0862 711/162 |
| 8,874,612 B2* | 10/2014 | Tiu, Jr. | G06F 17/30867 707/778 |
| 2008/0120501 A1* | 5/2008 | Jannink et al. | 713/163 |
| 2008/0288494 A1* | 11/2008 | Brogger et al. | 707/7 |
| 2009/0144392 A1* | 6/2009 | Wang et al. | 709/217 |
| 2013/0073568 A1* | 3/2013 | Federov et al. | 707/749 |

* cited by examiner

*Primary Examiner* — Kevin Bates
*Assistant Examiner* — Nazia Naoreen
(74) *Attorney, Agent, or Firm* — Baker Botts L.L.P.

(57) ABSTRACT

In particular embodiments, the newsfeed is rendered to a particular user using the locally stored copy of the resource, instead of pulling it back from the server-side. Thus, a user may see his or her content even before it is completely uploaded to the social networking system. In particular embodiments, the user may interact with the content, for example, by adding comments, captions, "likes", etc. to the content even before it has been completely uploaded to the social networking system. In this manner, the user is provided an increased feeling of responsiveness that is independent of the current wireless link condition.

20 Claims, 3 Drawing Sheets

GENERATION OF ACTIVITY STREAM FROM SERVER-SIDE AND CLIENT-SIDE DATA

TECHNICAL FIELD

The present disclosure relates generally to a social networking and mobile devices and, more particularly, to the generation of an activity stream utilizing content provided by a remote server in conjunction with content cached or queued for transmission on a client.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may generate a webpage, or a newsfeed, for a particular user, comprising the recent activities of the user's first-degree connections on the social network. Users utilizing mobile devices having data connections to the social networking system may upload photos or perform actions remotely that appear on his or her news feed when the content is completely uploaded to the social networking system.

SUMMARY

Particular embodiments relate to a social networking system that includes features directed to automatically generating a newsfeed that includes both server-side content and content that is stored on a client at least some of which is queued for transmission to the social networking system stored on the client-side device. These and other features, aspects, and advantages of the disclosure are described in more detail below in the detailed description and in conjunction with the following figures.

DETAILED DESCRIPTION

Figure 1:
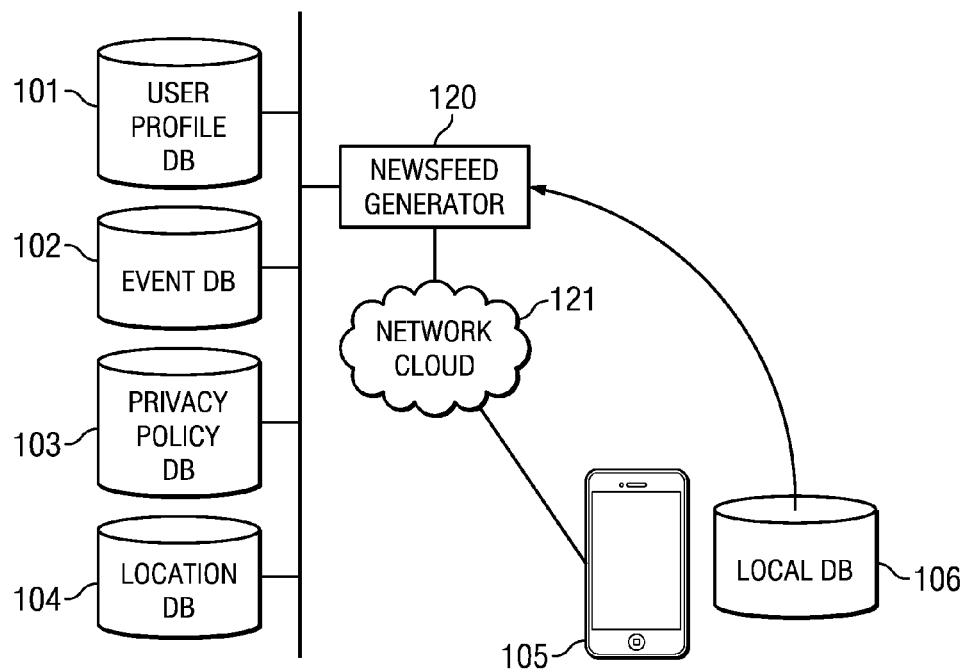
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the, friends or other social contacts of a user that requests a page corresponding to a place. U.S. application Ser. No. 12/858,718, incorporated by reference in its entirety for all purposes, describes an example geo-social networking system that can be used in connection with various embodiments of the present invention. The check-in activity may also be displayed on a user profile page and in news feeds provided to users of the social networking system.

In particular embodiments, the social networking system may provide a single webpage that displays the recent activity of the user's first-degree connections' actions on the social network. This type of view, also called a "news feed," allows a user of the social network to quickly view and access pertinent and temporally relevant information about his friends, interests, and pages the user has expressed an affinity to. The news feed, in particular embodiments, also includes story entries from the user's own actions on, and uploads to, the social networking system (such as status updates, wall posts, photo uploads, check-ins to a geo-social networking system). In particular embodiments, the stories in the news feed are organized chronologically. In particular embodiments, the stories in the news feed are organized based on a social relevancy score calculated by the social networking system.

In addition to geo-social functionality, the mobile device as described above may permit a user to remotely upload content, and perform other actions on the social network over a mobile data network. In particular embodiments, the user may, through his or her mobile device, upload photographs to the social networking system. The rate of upload is limited by the rate, quality, and coverage of the data connection of the mobile client device. In particular embodiments, the newsfeed is rendered to a particular user using the locally stored copy of the resource, instead of pulling it back from the server-side. Thus, a user may see his or her content even before it is completely uploaded to the social networking system. In particular embodiments, the user may interact with the content, for example, by adding comments, captions, "likes", etc. to the content even before it has been completely uploaded to the social networking system. In this manner, the user is provided an increased feeling of responsiveness that is independent of the current wireless link condition.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Front end 120 may also include a newsfeed generator that generates news feeds in response to user requests. In particular embodiments, news feed generator resides on one or more servers separate from front end 120. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place, check in to the place, upload photos related to the place (in connection with a check-in or at a later time). In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places.

In particular embodiments, users may utilize client device 122 to upload content or perform actions on the social network, such as status updates, wall posts, check-ins, and the like. Typically, these actions must be transmitted through mobile data network 121 to system front end 120, after which, when the user requests a newsfeed, the social networking system generates a news feed solely from server-side content. Thus, any content or actions that have not been fully uploaded to the social networking system will not appear on a user's news feed, regardless of when the user initiated the upload. Upload times may be delayed significantly due to the state of the user's mobile wireless data link. For example, if a user desires to upload a photo while traveling, and the data connection is interrupted, the user will be unable to write a caption or comment on the photo until it is fully uploaded. In particular embodiments, the client device itself may decide to queue one or more of the activities for upload at a later time in order to, for example, conserve battery life.

Figure 2:
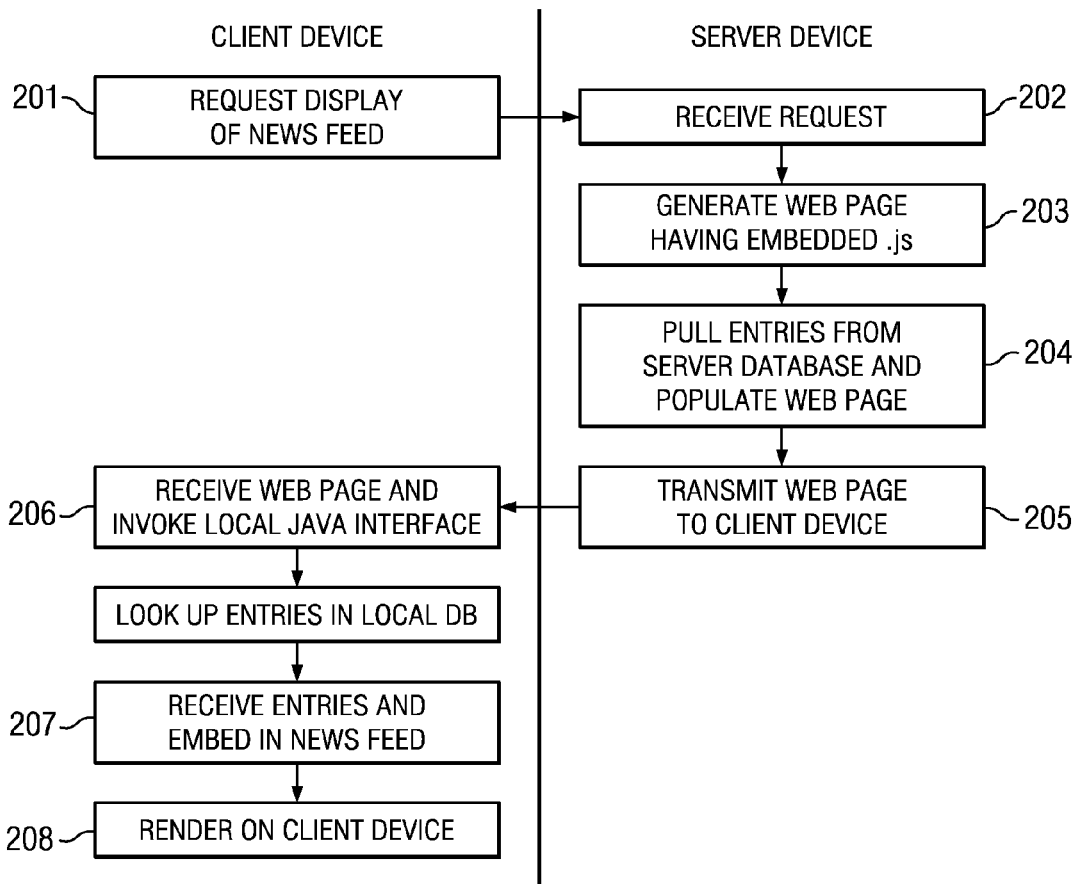
FIG. 2 illustrates an example method of generating a news feed using both server-side content and client-side content.

FIG. 2 illustrates an example method of generating a newsfeed incorporating both server-side and locally-stored content in accordance with one embodiment of the disclosure. FIG. 2 is divided vertically to distinguish between actions that are performed on the client device 122 on the left side, and actions that are performed on one or more servers of the social networking system on the right side. In particular embodiments, one or more server-side process steps may be performed on the client, and vice versa. This disclosure contemplates any suitable manner of dividing the method steps between the client or server.

At Step 201, the user of client device 122 chooses to view his or her news feed. In one implementation, the news feed may be embedded in a web page or any other suitable structured document that a client application can consume, parse and/or render. In particular embodiments, the user does this by invoking a specialized application, such as "Facebook for Android", on client device 122. In particular embodiments, the client application utilizes a browser engine (e.g., WebKit, etc.) to access a remote host associated with the social networking website, for example, www.facebook.com. In particular embodiments, the user may utilize a specialized mobile WAP browser to access a mobile version of the social networking website, such as m.facebook.com or touch.facebook.com. In particular embodiments, the browser application on client device 122 includes an application programming interface that connects to the social networking website, regardless of the address requested by the user, for example, Rockmelt for iPhone. This disclosure contemplates any suitable manner of initiating a request to view a news feed. While this disclosure describes the generation of a newsfeed, a news feed is not required. The requested page may be any sort of web page, such as a photo gallery, forum, calendar, or message board. This disclosure contemplates any suitable web content that incorporates both server side and client side data to be uploaded to the server.

At Step 202, the server receives the request from client device 122 to view the user's newsfeed. In particular embodiments, the request includes the social network user identifier (UID) of the user associated with client device 122. In one implementation, the social network user identifier may be contained in a browser cookie appended to the request. In other implementations, the UID may be a parameter encoded in a URI string. In particular embodiments, the request includes authentication information to prevent unauthorized access. In particular embodiments, the server will only respond to a request after the user has performed an authentication procedure such as logging in. In some implementations, access tokens can be embedded in browser cookies upon successful authentication. This disclosure contemplates any suitable manner of identifying a specific social network UID for a given request.

At Step 203, the social networking system begins to generate a webpage representing the newsfeed for the requesting user. The webpage may be generated as HTML, XML, JavaScript, XHTML, or any other suitable markup language. The web page may be generated by system front end 120, a dedicated newsfeed generation application residing on one or more servers of the social networking system, a web server, or any other software application module residing on one or more servers of the social networking system. The web page created in Step 403 includes an embedded script (for example, a JavaScript having a .js file extension) that interacts with the local java interface of client device 122. Although this disclosure describes an embedded JavaScript object, in particular embodiments, the embedded object may be any scripting language or subset of JavaScript, such as AJAX, Action Script, CoffeScript, JScript, ASP, or VBScript.

At Step 204, the social networking system pulls entries from the server database to populate the web page representing the requesting user's newsfeed. In particular embodiments, the content may be pulled from an aggregate dynamic activity stream of all users maintained by the social network. In particular embodiments, stories or entries from the activity stream are matched against privacy policy DB 103 before insertion into the generated webpage. In this manner, the user is not allowed to view any content or activities from dynamic activity stream from users who have designated the user should not see. In particular embodiments, the server pulls content and activities directly from user profile DB 101, event DB 102, and location DB 104, subject to privacy policies stored in privacy policy DB 103. In particular embodiments, recent actions from the requesting user's first-degree contacts are inserted into the news feed. In particular embodiments, updates from hub pages, businesses, and other entities that the user has "liked" or otherwise expressed an affinity toward are inserted into the website generated in response to the user's newsfeed request. In particular embodiments, the user may specify newsfeed settings designating particular users, applications, or other entities whose stories should not be displayed. Further description of news feed generation may be found in the commonly-owned U.S. Pat. No. 7,669,123, titled, "Dynamically providing a news feed about a user of a social network," herein fully incorporated by reference in this disclosure. This disclosure contemplates any suitable manner of generating and managing the content of a particular user news feed.

At Step 205, server front end 120 transmits the generated web page representing the requesting user's news feed to client device 122 over network 121. Network 121 may comprise a plurality of different networks of varying transmission media, such as a wired fiber network and a wireless cellular network. In particular embodiments, system front end 120 transmits the webpage over a secure tunnel, such as a secure socket layer (SSL) tunnel or virtual private network (VPN) tunnel. This disclosure contemplates any suitable manner of transmitting the generated newsfeed to client device 122. The transmitted webpage includes both the server-side stories pulled from the social networking system's dynamic activity stream or individual DBs 101-104, as well as the embedded script described above.

At Step 206, client device 122 receives the transmitted web page representing the requesting user's newsfeed. In particular embodiments, the JavaScript object embedded in the transmitted web page invokes a call to the local Java interface to pull client-side stories or actions in local DB 106. As previously explained, local DB 106 stores an activity stream of user content and actions that have not been fully uploaded to the social networking system. For example, if a user had previously initiated the upload of a photo and then immediately requested to view his or her newsfeed, at Step 406 the local Java interface requests the stream stories stored in local DB 106 to display the photo story in the user's newsfeed as if it had been uploaded instantaneously. In particular embodiments, the embedded JavaScript may be invoked by an onLoad, onClick, or other event, so that new client-side content may be pulled into the news feed any time the page is reloaded, or any time a user clicks a link. Although this paragraph describes a Java interface, this disclosure contemplates any suitable means of pulling local data for rendering. In particular embodiments, the transmitted web page utilizes a browser API extension to pull client-side stories or actions in local DB 106. In particular embodiments, the transmitted web page utilizes a URL callback to pull client-side stories or actions in local DB 106.

At Step 207, the local Java interface retrieves the locally stored stream stories and actions from local DB 106. In particular embodiments, local DB 106 stores a copy of the content to be uploaded or in the process of being uploaded to the social network. For example, if a photo is stored on local storage of client device 122 separate from local DB 106, an exact or modified copy of the photo is stored in local DB 106. In particular embodiments, local DB 106 stores a stream story in accordance with a predetermined format specified by the social network and a pointer to the content, for example, a pointer or link to the photo in client device 122's photo storage memory. In particular embodiments, actions on content to be uploaded is also stored in local DB 106. For example, a user may include comments, captions, or "likes" on any given piece of content to be uploaded. In particular embodiments, these actions are stored along with a link or pointer to the content in local DB 106. Alternatively, the actions may be stored along with an exact or modified copy of the unuploaded content in local DB 106. This disclosure contemplates any suitable manner of storing content and actions, or pointers thereto, in local DB 106.

In Step 208, the social networking application on client device 122 renders the received webpage including the stories pulled from local DB 106. As previously discussed, the social networking application may be a specialized social networking application, a standard internet browser, a lightweight mobile WAP browser, or a specialized browser interfacing with the social networking system. The application displays the newsfeed to the requesting user as if the stories and the content in local DB 106 were instantly uploaded to the social networking system, even if they have not completed, or even begun, uploading to the social networking system. In particular embodiments, the social networking system arranges the server-side and client-side stories in chronological order. In particular embodiments, they are displayed based on a relevance score. In particular embodiments, the relevance score is calculated based on a coefficient score between the user and the user generating the story. The coefficient score may take into account the degree of interaction between the two users, their similarity, their geographic proximity, and their affinities. This disclosure contemplates any suitable manner of organizing the ordering of stories in the received news feed.

In particular embodiments, the application on client device 122 rendering the news feed includes an upload progress indicator below each story or piece of content currently being uploaded. In particular embodiments, the progress indicator is a progress bar. In particular embodiments, it is expressed as a numerical percentage. In particular embodiments, the user is provided a set of visual controls permitting the user to pause or cancel the upload. For example, if a user uploads a set of photos from a foreign country where his or her client device 122 lacks a data connection, and later decides not to upload one or more of the photos, he or she may select a "cancel" option to prevent the content from ever reaching the social networking system servers.

Figure 3:
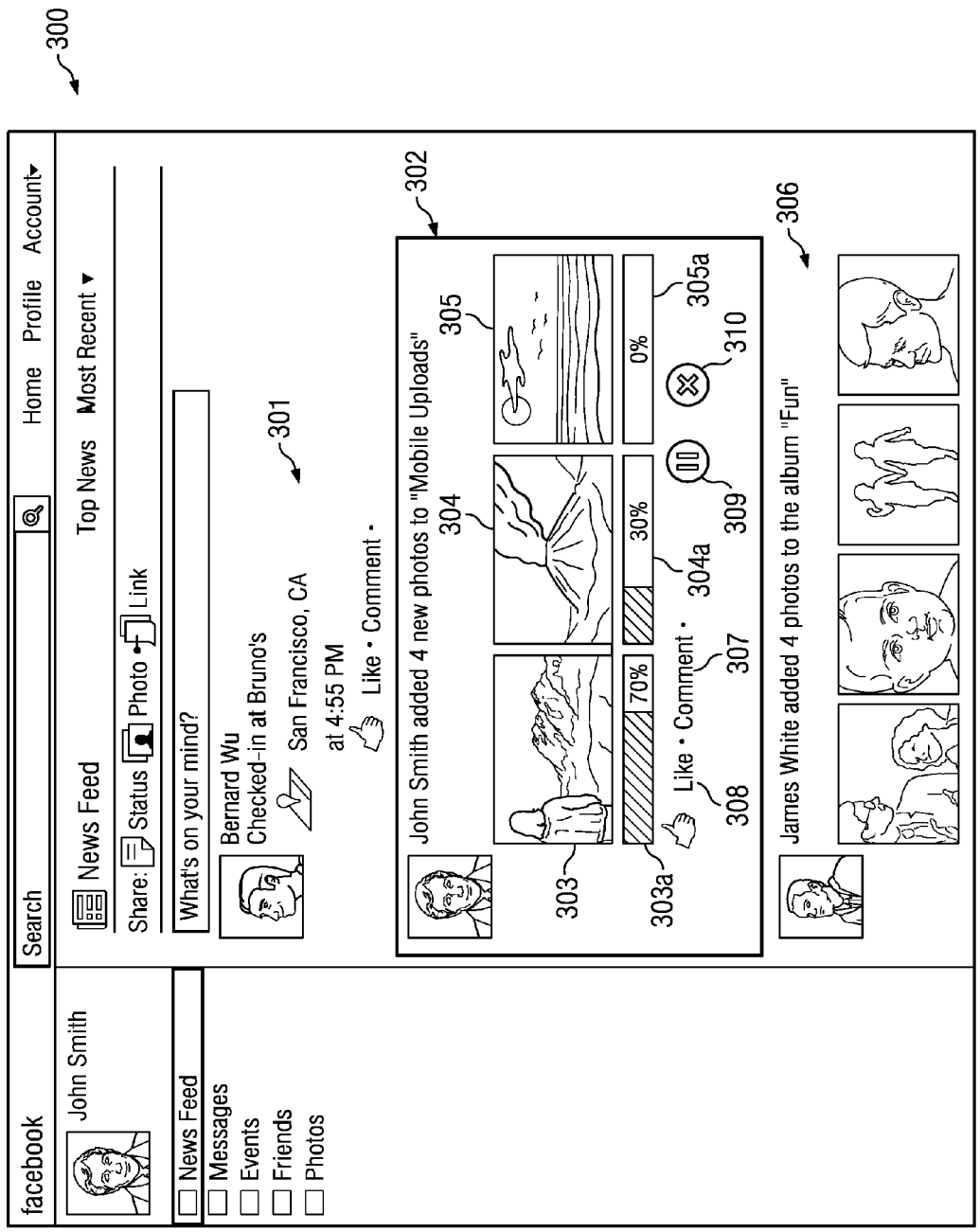
FIG. 3 illustrates an example news feed depicting server and client-side stories during the upload process.

FIG. 3 illustrates an example of a user news feed 300 having both server-side stories and client-side stories that have not been fully uploaded to the social networking system. Newsfeed 300 is the view generated by social networking system for the user "John Smith." it includes filters for "Top News" and "Most Recent", which allow the user to sort the entries in the news feed by social relevance or chronologically, respectively. News feed 300 includes server-side story entries 301 and 306. These, stories are, as previously discussed, pulled from server side databases or activity streams, and inserted in the transmitted website. Newsfeed 300 also includes client-side story entry 302. In this case, the user, "John Smith" initiated the upload of 4 photos (although only three are displayed in this example), 303, 304, and 305. Photos 303-305 are rendered to the user from the user's client device 122's local DB, and therefore are displayed in full-resolution and without any degradation in quality. From photos 303-305 alone, news feed entry 302 is indistinguishable from entries 301 and 306 to a viewing user.

In particular embodiments, photos 303-035 may have progress indicators 303a, 304a, and 305a, respectively. Progress indicators graphically or numerically display the upload progress of a particular piece of client-side content. Whereas textual content, such as comments, "likes", and check-ins, is uploaded fairly quickly, photos and videos take a substantial amount of time to upload, particularly where the mobile data connection is slow. Thus, the user may upload a photo, and at any time, request a view of his or her news feed and see a photo story such as 302 before the photo is actually uploaded to the social networking system's servers. The user may also interact with the content by using the comment button 307 or the "like" button 308. Thus, the user perceives the upload to be substantially in real-time; the moment he or she decides to upload content, the user may interact with it as if it were already existing on the server. Thus, the disclosed embodiments enhance user experience by masking delays in the uploading of content or other interactions by displaying a rendered representation of the locally stored data in connection with the server side content. Additionally, reloading a web page representation of a newsfeed may cause the embedded script to retrieve additional content from the client side. Such an invention gives the perception of instanteous, real-time uploading of content and interactions.

In particular embodiments, newsfeed 300 includes, for photos 303-305, pause button 309 and cancel button 310. This permits a user to pause or cancel the upload of a piece of content. For example, a user may inadvertently upload an incriminating photo. At any time during the upload process, the user may cancel the photo through cancel button 310 to prevent the file from ever reaching the social networking system's servers. Therefore, in particular embodiments, the invention enhances the user experience by removing delays in uploading content or other interactions via the display of a rendered representation of the locally stored data in connection with the server side content. Additionally, a "reload page" may cause the javascript or requested webpage to retrieve additional content from client side prior to its upload to the server.

Figure 4:
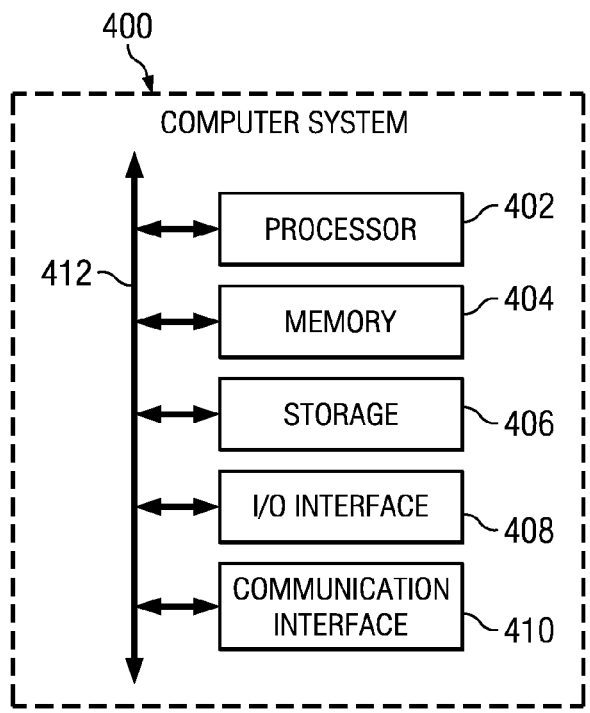
FIG. 4 illustrates an example computer system.

FIG. 4 illustrates an example computer system 400, which may be used with some embodiments of the present invention. This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. In particular embodiments, one or more memory management units (MMUs) reside between processor 402 and memory 404 and facilitate accesses to memory 404 requested by processor 402. In particular embodiments, memory 404 includes random access memory (RAM). Memory 404 may include one or more memories 402, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a I-IYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Degital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 412 may include one or more buses 412, where appropriate. Although this disclosure describes and illustrates a particular bus, this disclosure contemplates any suitable bus or interconnect.

Figure 5:
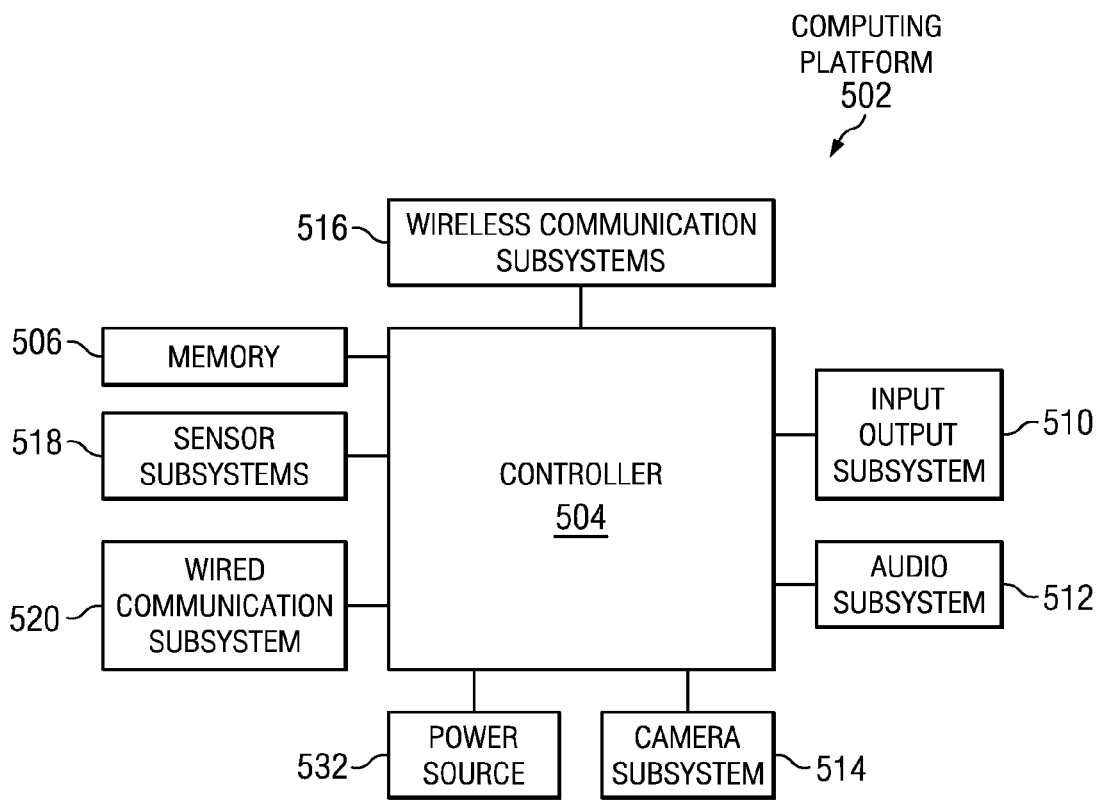
FIG. 5 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 5 shows a schematic representation of the main components of an example computing platform of a client or mobile device, according to various particular embodiments. In particular embodiments, computing platform 502 may comprise controller 504, memory 506, and input output subsystem 510. In particular embodiments, controller 504 which may comprise one or more processors and/or one or more microcontrollers configured to execute instructions and to carry out operations associated with a computing platform. In various embodiments, controller 504 may be implemented as a single-chip, multiple chips and/or other electrical components including one or more integrated circuits and printed circuit boards. Controller 504 may optionally contain a cache memory unit for temporary local storage of instructions, data, or computer addresses. By way of example, using instructions retrieved from memory, controller 504 may control the reception and manipulation of input and output data between components of computing platform 502. By way of example, controller 504 may include one or more processors or one or more controllers dedicated for certain processing tasks of computing platform 502, for example, for 2D/3D graphics processing, image processing, or video processing.

Controller 504 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 506 that is operatively coupled to controller 504.

Memory 506 may encompass one or more storage media and generally provide a place to store computer code (e.g., software and/or firmware) and data that are used by computing platform 502. By way of example, memory 506 may include various tangible computer-readable storage media including Read-Only Memory (ROM) and/or Random-Access Memory (RAM). As is well known in the art, ROM acts to transfer data and instructions uni-directionally to controller 504, and RAM is used typically to transfer data and instructions in a bi-directional manner. Memory 506 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 504. Information may also reside on one or more removable storage media loaded into or installed in computing platform 502 when needed. By way of example, any of a number of suitable memory cards (e.g., SD cards) may be loaded into computing platform 502 on a temporary or permanent basis.

Input output subsystem 510 may comprise one or more input and output devices operably connected to controller 504. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 502. The display is generally configured to display a graphical user interface (GUI) that provides an easy to use visual interface between a user of the computing platform 502 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 510 may also include touch based devices such as touch pad and touch screen. A touchpad is an input device including a surface that detects touch-based inputs of users. Similarly, a touch screen is a display that detects the presence and location of user touch inputs. Input output system 510 may also include dual touch or multi-touch displays or touch pads that can identify the presence, location and movement of more than one touch inputs, such as two or three finger touches.

In particular embodiments, computing platform 502 may additionally comprise audio subsystem 512, camera subsystem 512, wireless communication subsystem 516, sensor subsystems 518, and/or wired communication subsystem 520, operably connected to controller 504 to facilitate various functions of computing platform 502. For example, Audio subsystem 512, including a speaker, a microphone, and a codec module configured to process audio signals, can be utilized to facilitate voice-enabled functions, such as voice recognition, voice replication, digital recording, and telephony functions. For example, camera subsystem 512, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 520 can include a Universal Serial Bus (USB) port for file transferring, or a Ethernet port for connection to a local area network (LAN).

Wireless communication subsystem 516 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 516 may include hosting protocols such that computing platform 502 may be configured as a base station for other wireless devices.

Sensor subsystem 518 may include one or more sensor devices to provide additional input and facilitate multiple functionalities of computing platform 502. For example, sensor subsystems 518 may include GPS sensor for location positioning, altimeter for altitude positioning, motion sensor for determining orientation of a mobile device, light sensor for photographing function with camera subsystem 514, temperature sensor for measuring ambient temperature, and/or biometric sensor for security application (e.g., fingerprint reader).

In particular embodiments, various components of computing platform 502 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Additionally, computing platform 502 may be powered by power source 532.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or Machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    by a client computing device, locally storing first user content and social-network actions on the client computing device;
    by the client computing device, receiving an electronic document from a server of a social-networking system, the electronic document comprising (1) instructions for displaying at least a portion of the electronic document at the client computing device and (2) second user content from the social-networking system;
    by the client computing device, in accordance with the instructions for displaying at least a portion of the electronic document, retrieving an activity stream comprising the first user content and the social-network actions locally stored in a database on the client computing device, wherein the first user content has not been sent by the client computing device to the social-networking system;
    by the client computing device, incorporating the activity stream into at least the portion of the electronic document;
    by the client computing device, displaying at least the portion of the electronic document, including the locally-stored first user content and information regarding the social-network actions locally stored on the client computing device; and
    by the client computing device, concurrently sending the locally-stored first user content and the social-network actions locally stored on the client computing device to the social-networking system.

2. The method of claim 1, wherein the locally-stored first user content comprises one or more locally-stored content items cached or queued for sending to the social-networking system.

3. The method of claim 1, wherein displaying at least the portion of the electronic document including the locally-stored first user content comprises displaying an upload progress indicator for a locally-stored content item of the locally-stored first user content.

4. The method of claim 1, wherein the activity stream comprises one or more client interactions with one or more locally-stored content items.

5. The method of claim 4, wherein the client interactions comprise one or more comments associated with the one or more locally-stored content items.

6. The method of claim 4, wherein the client interactions comprise one or more likes associated with the one or more locally-stored content items.

7. The method of claim 4, wherein the client interactions comprise one or more tags associated with the one or more locally-stored content items.

8. The method of claim 4, wherein the client interactions comprise one or more captions associated with the one or more locally-stored content items.

9. The method of claim 1, wherein the second user content from the social-networking system comprises one or more server-side content items, the locally-stored first user content comprises one or more locally-stored content items, and wherein displaying at least the portion of the electronic document including the locally-stored first user content comprises displaying the locally-stored content items and the server-side content items in a predetermined order.

10. The method of claim 9, wherein the predetermined order is a chronological order.

11. The method of claim 9, wherein the predetermined order is based on a relevancy score.

12. An apparatus comprising:
one or more processors;
one or more non-transitory, computer-readable media comprising instructions, the instructions operable, when executed by the one or more processors, to:
at a client computing device, locally store first user content and social-network actions on the client computing device;
at the client computing device, receive an electronic document from a server of a social-networking system, the electronic document comprising (1) instructions for displaying at least a portion of the electronic document at the client computing device and (2) second user content from the social-networking system;
at the client computing device, in accordance with the instructions for displaying at least a portion of the electronic document, retrieve an activity stream comprising the first user content and the social-network actions locally stored in a database on the client computing device, wherein the first user content has not been sent by the client computing device to the social-networking system;
at the client computing device, incorporate the activity stream into at least the portion of the electronic document;
at the client computing device, display at least the portion of the electronic document, including the locally-stored first user content and information regarding the social-network actions locally stored on the client computing device; and
at the client computing device, concurrently send the locally-stored first user content and the social-network actions locally stored on the client computing device to the social-networking system.

13. The apparatus of claim 12, wherein the locally-stored first user content comprises one or more locally-stored content items cached or queued for sending to the social-networking system.

14. The apparatus of claim 12, wherein the instructions operable, when executed by the one or more processors, to display at least a portion of the electronic document including the locally-stored first user content comprise instructions to display an upload progress indicator for a locally-stored content item of the locally-stored first user content.

15. The apparatus of claim 12, wherein the locally-stored user content comprises one or more client interactions with one or more locally-stored content items.

16. The apparatus of claim 15, wherein the client interactions comprise one or more comments associated with the one or more locally-stored content items.

17. The apparatus of claim 15, wherein the client interactions comprise one or more likes associated with the one or more locally-stored content items.

18. The apparatus of claim 15, wherein the client interactions comprise one or more tags associated with the one or more locally-stored content items.

19. The apparatus of claim 15, wherein the client interactions comprise one or more captions associated with the one or more locally-stored content items.

20. The apparatus of claim 12, wherein the second user content from the social-networking system comprises one or more server-side content items, the locally-stored first user content comprises one or more locally-stored content items, and wherein the instructions operable, when executed by the one or more processors, to display at least the portion of the electronic document including the locally-stored first user content comprise instructions to display the locally-stored content items and the server-side content items in a predetermined order.

* * * * *